(12) United States Patent
Sugimori et al.

(10) Patent No.: US 10,903,485 B2
(45) Date of Patent: Jan. 26, 2021

(54) NEGATIVE ELECTRODE FOR NONAQUEOUS ELECTROLYTE SECONDARY BATTERIES, AND NONAQUEOUS ELECTROLYTE SECONDARY BATTERY

(71) Applicant: Panasonic Intellectual Property Management Co., Ltd., Osaka (JP)

(72) Inventors: Masanori Sugimori, Hyogo (JP); Yasunori Baba, Hyogo (JP); Katsunori Yanagida, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 150 days.

(21) Appl. No.: 16/325,557

(22) PCT Filed: Aug. 22, 2017

(86) PCT No.: PCT/JP2017/029843
§ 371 (c)(1),
(2) Date: Feb. 14, 2019

(87) PCT Pub. No.: WO2018/043188
PCT Pub. Date: Mar. 8, 2018

(65) Prior Publication Data
US 2019/0214635 A1    Jul. 11, 2019

(30) Foreign Application Priority Data
Aug. 31, 2016   (JP) .................................. 2016-170099

(51) Int. Cl.
*H01M 4/36*     (2006.01)
*H01M 4/131*    (2010.01)
(Continued)

(52) U.S. Cl.
CPC .......... *H01M 4/364* (2013.01); *H01M 4/131* (2013.01); *H01M 4/485* (2013.01); *H01M 4/602* (2013.01);
(Continued)

(58) Field of Classification Search
CPC ...... H01M 4/364; H01M 4/485; H01M 4/602; H01M 4/131; H01M 4/621
See application file for complete search history.

(56) References Cited

U.S. PATENT DOCUMENTS

| | | | |
|---|---|---|---|
| 2009/0136845 A1* | 5/2009 | Choi ................... | H01M 4/0414 429/212 |
| 2016/0336598 A1* | 11/2016 | Yazami .............. | H01M 10/052 |
| 2017/0110723 A1 | 4/2017 | Ishibashi et al. | |

FOREIGN PATENT DOCUMENTS

| | | |
|---|---|---|
| JP | 2010-225467 A | 10/2010 |
| JP | 2012-69454 A | 4/2012 |

(Continued)

OTHER PUBLICATIONS

International Search Report dated Oct. 31, 2017, issued in counterpart International Application No. PCT/JP2017/029843 (2 pages).

*Primary Examiner* — Matthew J Merkling
(74) *Attorney, Agent, or Firm* — Westerman, Hattori, Daniels & Adrian, LLP (57) ABSTRACT

A negative electrode for nonaqueous electrolyte secondary batteries includes a negative electrode current collector and a negative electrode mixture layer disposed on the negative electrode current collector, and the negative electrode mixture layer contains a negative electrode active material containing lithium titanate, a binder, and a (meth)acrylic acid-based polymer. The amount of the (meth)acrylic acid-based polymer in the negative electrode mixture layer is 10 mass % or less relative to the total amount of the (meth) acrylic acid-based polymer and the binder. The amount of (Continued)

the (meth)acrylic acid-based polymer in a portion of the negative electrode mixture layer that extends from the surface to the middle of the negative electrode mixture layer in the thickness direction (upper region) is 60 mass % or more relative to the total amount of the (meth)acrylic acid-based polymer.

5 Claims, 1 Drawing Sheet

(51) Int. Cl.
*H01M 4/485* (2010.01)
*H01M 4/62* (2006.01)
*H01M 4/60* (2006.01)
*H01M 10/0525* (2010.01)
*H01M 4/02* (2006.01)

(52) U.S. Cl.
CPC ........... *H01M 4/621* (2013.01); *H01M 4/622* (2013.01); *H01M 4/628* (2013.01); *H01M 10/0525* (2013.01); *H01M 2004/027* (2013.01); *H01M 2004/028* (2013.01)

(56) References Cited

FOREIGN PATENT DOCUMENTS

| | | |
|---|---|---|
| JP | 2013-93240 A | 5/2013 |
| JP | 2013-114882 A | 6/2013 |
| JP | 2013-134923 A | 7/2013 |
| JP | 2016-129109 A | 7/2016 |
| WO | 2016/038682 A1 | 3/2016 |

\* cited by examiner

NEGATIVE ELECTRODE FOR NONAQUEOUS ELECTROLYTE SECONDARY BATTERIES, AND NONAQUEOUS ELECTROLYTE SECONDARY BATTERY

TECHNICAL FIELD

The present disclosure relates to a negative electrode for nonaqueous electrolyte secondary batteries and to a nonaqueous electrolyte secondary battery.

BACKGROUND ART

PTL 1 discloses a technique in which 10 mass % or more, preferably 20 mass % or more of polyacrylic acid is used as a binder to suppress deterioration of a positive electrode. PTL 1 describes that water absorption of the polyacrylic acid suppresses side reactions in the positive electrode caused by water and thus, an increase in positive electrode resistance is suppressed.

CITATION LIST

Patent Literature

PTL 1: International Publication No. 2016/038682

SUMMARY OF INVENTION

It is known that lithium titanate (LTO), which is used as a negative electrode active material, contains many electrochemically active sites, such as hydroxyl groups, on the particle surface thereof. During charging/discharging in a high-temperature environment, decomposition of the electrolytic solution in a secondary battery starts at the electrochemically active sites, and a resistive coating that inhibits the movement of lithium ions is formed on the surface of the lithium titanate particles. This may lead to a decrease in the output retention percentage.

An object of the present disclosure is to provide a negative electrode for nonaqueous electrolyte secondary batteries that suppresses a decrease in the output retention percentage that is caused by charging/discharging in a high-temperature environment.

A negative electrode for nonaqueous electrolyte secondary batteries according to one aspect of the present disclosure includes a negative electrode current collector and a negative electrode mixture layer disposed on the negative electrode current collector, and the negative electrode mixture layer contains a negative electrode active material containing lithium titanate, a binder, and a (meth)acrylic acid-based polymer. The amount of the (meth)acrylic acid-based polymer in the negative electrode mixture layer is 10 mass % or less relative to the total amount of the (meth) acrylic acid-based polymer and the binder. The amount of the (meth)acrylic acid-based polymer in a portion of the negative electrode mixture layer that extends from the surface to the middle of the negative electrode mixture layer in the thickness direction is 60 mass % or more relative to the total amount of the (meth)acrylic acid-based polymer.

The negative electrode for nonaqueous electrolyte secondary batteries according to one aspect of the present disclosure can suppress a decrease in the output retention percentage that is caused by charging/discharging in a high-temperature environment.

DESCRIPTION OF EMBODIMENTS

Figure 1:
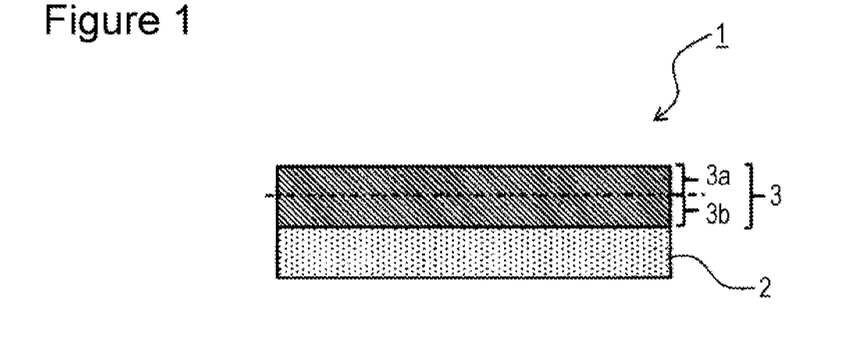
FIG. 1 is a schematic cross-sectional view of a part of an example of a negative electrode for nonaqueous electrolyte secondary batteries according to an embodiment.

FIG. 1 is a schematic cross-sectional view of a part of an example of a negative electrode for nonaqueous electrolyte secondary batteries according to an embodiment. As illustrated in FIG. 1, a negative electrode 1 for nonaqueous electrolyte secondary batteries includes a negative electrode current collector 2 formed of a material, such as a metal foil, and a negative electrode mixture layer 3 formed on the negative electrode current collector 2. In FIG. 1, the negative electrode mixture layer 3 is disposed on one surface of the negative electrode current collector 2; however, the structure is not limited to such a structure, and the negative electrode mixture layer 3 may be disposed on each surface of the negative electrode current collector 2.

The negative electrode mixture layer 3 contains a negative electrode active material containing lithium titanate, a binder, and a (meth)acrylic acid-based polymer. The negative electrode mixture layer 3 may contain another additive, such as a conductive agent, if necessary. The (meth)acrylic acid-based polymer refers to at least one of a methacrylic acid-based polymer and an acrylic acid-based polymer.

The amount of (meth)acrylic acid-based polymer in the negative electrode mixture layer 3 is 10 mass % or less relative to the total amount of (meth)acrylic acid-based polymer and binder (binder+(meth)acrylic acid-based polymer).

When the negative electrode mixture layer 3 is divided into an upper region 3a and a lower region 3b, the amount of (meth)acrylic acid-based polymer in the upper region 3a of the negative electrode mixture layer 3 is 60 mass % or more relative to the total amount of (meth)acrylic acid-based polymer in the negative electrode mixture layer 3. The upper region 3a of the negative electrode mixture layer 3 refers to a portion of the negative electrode mixture layer that extends from the surface (the surface facing away from the negative electrode current collector 2) to the middle of the negative electrode mixture layer 3 in the thickness direction. The lower region 3b of the negative electrode mixture layer 3 refers to a portion of the negative electrode mixture layer that extends from the surface, the surface being in contact with the negative electrode current collector 2, to the middle of the negative electrode mixture layer 3 in the thickness direction.

As described here, during charging/discharging in a high-temperature environment, decomposition of the electrolytic solution in a secondary battery starts at electrochemically active sites, such as hydroxyl groups, on the surface of lithium titanate (LTO) particles, and a resistive coating that inhibits the movement of lithium ions is formed on the surface of the lithium titanate particles. This may lead to a decrease in the output retention percentage. Formation of such a resistive coating starts in the surface side portion of the negative electrode mixture layer 3 (the side near the surface facing away from the negative electrode current collector 2). In particular, the higher the current during charging/discharging in a high-temperature environment, the nearer to the surface of the negative electrode mixture layer 3 the formation of the resistive coating is likely to occur.

The negative electrode 1 for nonaqueous electrolyte secondary batteries according to the present embodiment can suppress a decrease in the output retention percentage that is caused by charging/discharging in a high-temperature environment. This mechanism is not fully clarified; however, it is assumed as follows. As in the present embodiment, the amount of (meth)acrylic acid-based polymer in the upper region 3a of the negative electrode mixture layer 3 is set to 60 mass % or more, in other words, a large amount of (meth)acrylic acid-based polymer is disposed in the surface side portion, to cover electrochemically active sites in the surface side portion with the polymer, so that formation of the resistive coating that is caused by a decomposition reaction of the electrolytic solution is suppressed. Note that the (meth)acrylic acid-based polymer has an effect of suppressing formation of the resistive coating and, on the other hand, has low electrical conductivity. Thus, if the polymer content is excessive, the proportion of the surface of the negative electrode active material particles covered by the polymer or the proportion of the negative electrode active material covered by the polymer is increased, and thus, electrode resistance in the initial state is increased, and battery resistance in the initial state is eventually increased. As a result, an excessive polymer content may affect a decrease in the output retention percentage that is caused by charging/discharging in a high-temperature environment. However, as in the present embodiment, the amount of (meth)acrylic acid-based polymer in the negative electrode mixture layer 3 is set to 10 mass % or less relative to the total amount of (meth)acrylic acid-based polymer and binder, so that an increase in electrode resistance in the initial state (battery resistance in the initial state) can be suppressed. As described above, in the present embodiment, it is assumed that suppressing formation of a resistive coating and an increase in electrode resistance in the initial state suppresses a decrease in the output retention percentage that is caused by charging/discharging in a high-temperature environment.

The acrylic acid-based polymer is at least one selected from a polyacrylic acid, a polyacrylic acid salt, and a polyacrylic acid copolymer. The methacrylic acid-based polymer is at least one selected from a polymethacrylic acid, a polymethacrylic acid salt, and a polymethacrylic acid copolymer.

The polyacrylic acid (polymethacrylic acid) is a polymer of acrylic acid (methacrylic acid) and is not limited as long as the monomer thereof is acrylic acid (methacrylic acid). The polyacrylic acid salt (polymethacrylic acid salt) is a compound in which hydrogen atoms of carboxyl groups of a polyacrylic acid (polymethacrylic acid) are substituted by cations (e.g., Li ions, Na ions, or K ions). The polyacrylic acid copolymer (polymethacrylic acid copolymer) is a polymer of acrylic acid (methacrylic acid) and one or more monomers other than acrylic acid (methacrylic acid). An acrylic acid salt (methacrylic acid salt) may be used as a monomer of the copolymer instead of an acrylic acid. The one or more monomers are not particularly limited as long as the one or more monomers are capable of forming a copolymer with acrylic acid (methacrylic acid). Examples of the one or more monomers include carboxylic acids (linear unsaturated dicarboxylic acid), such as maleic acid and fumaric acid, and alcohols, such as vinyl alcohol.

The acrylic acid-based polymer is preferably a polyacrylic acid salt. Examples of the polyacrylic acid salt include alkyl metal salts, alkyl earth metal salts, and ammonium salts of polyacrylic acid, polyacrylamides, and polyacrylic acid esters, and copolymers thereof. The polyacrylic acid salt may be a partially neutralized salt. A polyacrylic acid salt containing an alkali metal, particularly Na or Li, is more preferably used, and such a polyacrylic acid salt easily suppresses formation of a resistive coating.

The methacrylic acid-based polymer is preferably a polymethacrylic acid salt. Examples of the polymethacrylic acid salt include alkyl metal salts, alkyl earth metal salts, and ammonium salts of polymethacrylic acid, polymethacrylamides, and polymethacrylic acid esters, and copolymers thereof. The polymethacrylic acid salt may be a partially neutralized salt. A polyacrylic acid salt containing an alkali metal, particularly Na or Li, is more preferably used, and such a polyacrylic acid salt easily suppresses formation of a resistive coating.

The amount of (meth)acrylic acid-based polymer in the upper region 3a of the negative electrode mixture layer 3 is 60 mass % or more relative to the total amount of (meth)acrylic acid-based polymer in the negative electrode mixture layer 3; however, for example, from the viewpoint of suppressing a decrease in the output retention percentage that is caused by charging/discharging in a high-temperature environment and from the viewpoint of suppressing an increase in the initial resistance, the amount of (meth)acrylic acid-based polymer in the upper region 3a is preferably 70 mass % or more and 100 mass % or less and more preferably 80 mass % or more and 100 mass % or less.

The amount of (meth)acrylic acid-based polymer in the negative electrode mixture layer 3 is 10 mass % or less relative to the total amount of (meth)acrylic acid-based polymer and binder; however, for example, from the viewpoint of suppressing a decrease in the output retention percentage that is caused by charging/discharging in a high-temperature environment and from the viewpoint of suppressing an increase in the initial resistance, the amount of (meth)acrylic acid-based polymer in the negative electrode mixture layer 3 is preferably 0.1 mass % or more and 10 mass % or less, more preferably 1 mass % or more and 10 mass % or less, and 1 mass % or more and 7.5 mass % or less.

For example, from the viewpoint of suppressing a decrease in the output retention percentage that is caused by charging/discharging in a high-temperature environment and from the viewpoint of reliably obtaining capacitance density, the amount of (meth)acrylic acid-based polymer in the negative electrode mixture layer 3 is preferably 0.01 mass % or more and 3 mass % or less, more preferably 0.1 mass % or more and 2 mass % or less, still more preferably 0.1 mass % or more and 1 mass % or less, and 0.1 mass % or more and 0.3 mass % or less relative to the amount of negative electrode active material.

Examples of the binder include fluororesins, such as polytetrafluoroethylene (PTFE) and polyvinylidene fluoride (PVdF), polyacrylonitriles (PAN), polyimides, acrylic resins, polyolefins, carboxymethyl cellulose and salts thereof (CMC), polyethylene oxides (PEO), styrene-butadiene rubber (SBR), and polyvinyl alcohols (PVA). Such compounds may be used alone or in a combination of two or more.

The amount of binder in a portion of the negative electrode mixture layer that extends from the surface to the middle of the negative electrode mixture layer in the thickness direction is preferably 50 mass % or less and more preferably 40 mass % or less relative to the total amount of binder in the negative electrode mixture layer. Within the above range, an increase in electrode resistance in the initial state (battery resistance in the initial state) can be suppressed. The adhesive strength between the current collector and the negative electrode mixture layer is enhanced.

The lithium titanate may be a lithium titanate having a spinel structure represented by the general formula $Li_{4+x}Ti_{5-y}M_yO_{12+z}$ (in the formula, M is at least one selected from a group consisting of Mg, Al, Ca, Ba, Bi, Ga, V, Nb, W, Mo, Ta, Cr, Fe, Ni, Co, and Mn, and $-1 \le x \le 1$, $0 \le y \le 1$, and $-1 \le z \le 1$). Note that x is a value obtained soon after the lithium titanate is synthesized or when a battery is in a completely discharged state.

The lithium titanate preferably has an average particle diameter (median diameter in a volume-based particle diameter distribution: $D_{50}$) of, for example, 0.1 μm or more and 10 μm or less and more preferably 0.1 μm or more and 2 μm or less. If the average particle diameter is below 0.1 μm, the lithium titanate has low crystallinity, and thus, durability may be degraded. If the average particle diameter is above 30 μm, the amount of lithium ions accepted may be decreased. The volume-based particle diameter distribution of lithium titanate can be measured, for example, by using a commercially available laser diffraction particle diameter distribution analyzer.

The lithium titanate preferably has a BET specific surface area of, for example, 0.5 $m^2/g$ or more and 10 $m^2/g$ or less and more preferably 2.5 $m^2/g$ or more and 8.0 $m^2/g$ or less. If the specific surface area is below 0.5 $m^2/g$, the amount of lithium ions accepted may be decreased. If the specific surface area is above 10 $m^2/g$, the number of electrochemically active sites increases, and thus, the amount of resistive coating produced by a decomposition reaction of the electrolytic solution may be increased.

The negative electrode active material may contain a material, other than lithium titanate, that can reversibly intercalate and deintercalate lithium ions. Examples of such a material include carbon materials, such as natural graphite and synthetic graphite, a metal that can be alloyed with lithium, such as silicon (Si) and tin (Sn), and alloys and composite oxides that contain a metal element, such as Si or Sn. The material is preferably graphite.

From the viewpoint of, for example, output, the amount of lithium titanate relative to the total amount of negative electrode active material is, for example, preferably 80 mass % or more and more preferably 90 mass % or more and 100 mass % or less.

As the negative electrode current collector 2, for example, a foil of a metal, such as aluminum or copper, that is stable within the negative electrode electric potential or, for example, a film in which such a metal is disposed on the surface layer is used. From the viewpoint of cost, when lithium titanate is used as the negative electrode active material, an aluminum foil is preferably used.

Hereinafter, an example of a method for producing the negative electrode 1 for nonaqueous electrolyte secondary batteries according to the present embodiment will be described.

A negative electrode mixture slurry A for forming the lower region 3b of the negative electrode mixture layer 3 and a negative electrode mixture slurry B for forming the upper region 3a of the negative electrode mixture layer 3 are provided. The negative electrode mixture slurries A and B contain a negative electrode active material, a binder, and a (meth)acrylic acid-based polymer. The negative electrode mixture slurry A contains, for example, less than 40 mass % of the (meth)acrylic acid-based polymer relative to the total amount of acrylic acid-based polymer (total amount of slurries A and B). The negative electrode mixture slurry B contains, for example, 60 mass % or more of (meth)acrylic acid-based polymer relative to the total amount of acrylic acid-based polymer (total amount of slurries A and B). Then, the negative electrode mixture slurry A is applied to the negative electrode current collector 2 and dried to form the lower region 3b, and thereafter, the negative electrode mixture slurry B is applied to the lower region 3b and dried to form the upper region 3a. According to such a two-step coating formation, the negative electrode according to the present embodiment is obtained.

In the method, after the negative electrode mixture slurry A for the lower region is applied and dried, the negative electrode mixture slurry B for the upper region is applied. A method in which the negative electrode mixture slurry B for the upper region is applied before the negative electrode mixture slurry A for the lower region is applied and completely dried may be used. When the latter method is used, the negative electrode mixture layer 3 in which the negative electrode mixture slurry A for the lower region and the negative electrode mixture slurry B for the upper region are mixed together is easily formed.

Another method may be a method including applying a negative electrode mixture slurry containing a negative electrode active material, a binder, and, if necessary, a (meth)acrylic acid-based polymer to the negative electrode current collector and, while or after the coating is dried, spraying or applying a (meth)acrylic acid-based polymer dispersion liquid to the coating surface.

It is difficult to incorporate 60 mass % or more of the (meth)acrylic acid-based polymer into a portion of the negative electrode mixture layer that extends from the surface to the middle of the negative electrode mixture layer in the thickness direction by only one-step coating formation using a negative electrode mixture slurry containing a negative electrode active material, a binder, and a (meth)acrylic acid-based polymer. The reason for this is as follows. In an early stage of coating formation, many cationic functional groups contained in the (meth)acrylic acid-based polymer cause the polymer to form microaggregates, and thus, the polymer is immobilized. Therefore, the polymer is unlikely to move to the surface side portion of the negative electrode mixture layer.

Hereinafter, an example of a nonaqueous electrolyte secondary battery including the negative electrode 1 for nonaqueous electrolyte secondary batteries according to the present embodiment will be described. The nonaqueous electrolyte secondary battery described hereinafter is a laminate battery including an outer body formed of a laminate film; however, the nonaqueous electrolyte secondary battery according to the present disclosure is not limited to a laminate battery. A battery having another structure may be a cylindrical battery, a prismatic battery, or a coin battery.

Figure 2:
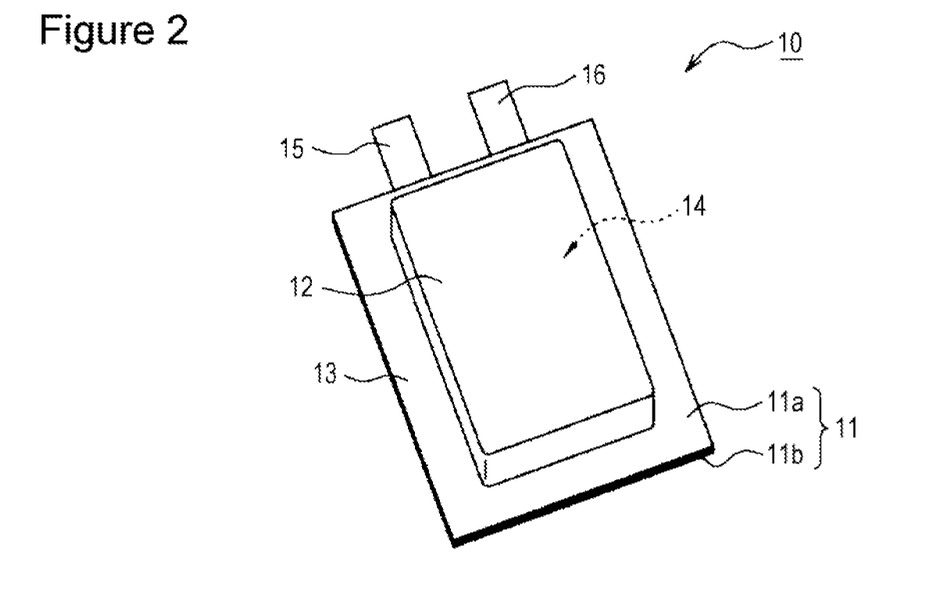
FIG. 2 is a perspective view of an example of a nonaqueous electrolyte secondary battery according to an embodiment.

FIG. 2 is a perspective view of an example of the nonaqueous electrolyte secondary battery according to an embodiment. As illustrated in FIG. 2, a nonaqueous electrolyte secondary battery 10 includes an outer body 11 formed of two laminate films 11a and 11b. The nonaqueous electrolyte secondary battery 10 includes an electrode body 14 and a nonaqueous electrolyte, which are accommodated in an accommodating portion 12 of the outer body 11.

The outer body 11 has, for example, a rectangular shape in plan view. The laminate films 11a and 11b are bonded to each other to form a sealing portion 13 in the outer body 11. This seals the accommodating portion 12 (the internal space of the outer body 11), in which the electrode body 14 is accommodated. The sealing portion 13 is formed along the edge of the outer body 11 and has a frame shape having substantially the same width. The accommodating portion 12 is a portion that is surrounded by the sealing portion 13 and that has a rectangular shape in plan view. The accommodating portion 12 is disposed by forming a recessed area that can accommodate the electrode body 14 in at least one of the laminate films 11a and 11b.

A film including a metal layer having a resin layer formed on each surface thereof is preferably used as the laminate films 11a and 11b. One of the resin layers is preferably formed of a thermocompression-bondable resin. The metal layer is, for example, a thin aluminum layer and has a function of preventing permeation of, for example, water. A preferable example of the laminate film is an aluminum laminate film.

The nonaqueous electrolyte secondary battery 10 includes a pair of electrode leads (a positive electrode lead 15 and a negative electrode lead 16) connected to the electrode body 14. Each of the electrode leads extends from the inside of the outer body 11 to the outside. In the example illustrated in FIG. 2, the electrode leads extend from the same side of the outer body 11 and are substantially parallel to each other. The electrode leads are each a thin electroconductive plate. For example, the positive electrode lead 15 is formed of a metal in which aluminum is the main constituent, and the negative electrode lead 16 is formed of a metal in which aluminum, copper, or nickel is the main constituent.

Figure 3:
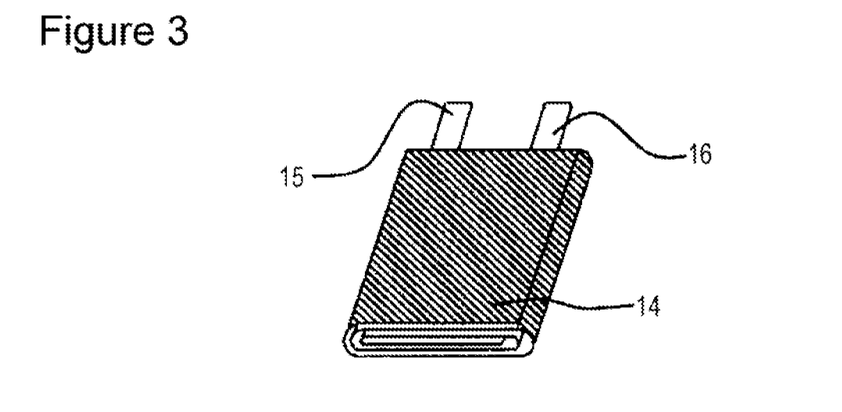
FIG. 3 is a perspective view of an example of an electrode body according to an embodiment.

FIG. 3 is a perspective view of an electrode body. The electrode body 14 illustrated in FIG. 3 has a structure, for example, in which a positive electrode and a negative electrode are wound with a separator disposed therebetween and compressed into a flat shape. FIG. 3 illustrates the wound-type electrode body 14; however, the electrode body may have another structure, such as a layered-type structure in which a plurality of positive electrodes and a plurality of negative electrodes are alternately layered with a separator disposed therebetween.

[Negative Electrode]

As the negative electrode, the above-described negative electrode for nonaqueous electrolyte secondary batteries is used. The structure of the negative electrode will be omitted.

[Positive Electrode]

The positive electrode is formed of a positive electrode current collector, such as a metal foil, and a positive electrode mixture layer formed on the positive electrode current collector. As the positive electrode current collector, for example, a foil of a metal, such as aluminum, that is stable within the positive electrode electric potential or, for example, a film in which such a metal is disposed on the surface layer is used. The positive electrode mixture layer contains, for example, a positive electrode active material, a conductive agent, and a binder. The positive electrode can be produced, for example, by applying the positive electrode mixture slurry containing, for example, a positive electrode active material, a conductive agent, and a binder to the positive electrode current collector, drying the coating, and then performing rolling to form a positive electrode mixture layer on the current collector. The positive electrode mixture layer may be formed on both surfaces or one surface of the current collector.

Examples of the conductive agent include carbon materials, such as carbon black, acetylene black, KETJEN-BLACK, and graphite. Such compounds may be used alone or in a combination of two or more.

The materials for the binder are the same as those for the negative electrode. Examples of the binder include fluororesins, such as polytetrafluoroethylene (PTFE) and polyvinylidene fluoride (PVdF), polyacrylonitriles (PAN), polyimides, acrylic resins, polyolefins, carboxymethyl cellulose and salts thereof (CMC), and polyethylene oxides (PEO). Such compounds may be used alone or in a combination of two or more.

The positive electrode active material contains a lithium transition metal oxide. The metal element contained in the lithium transition metal oxide is at least one selected from, for example, magnesium (Mg), aluminum (Al), calcium (Ca), scandium (Sc), titanium (Ti), vanadium (V), chromium (Cr), manganese (Mn), iron (Fe), cobalt (Co), nickel (Ni), copper (Cu), zinc (Zn), gallium (Ga), germanium (Ge), yttrium (Y), zirconium (Zr), tin (Sn), antimony (Sb), tungsten (W), lead (Pb), and bismuth (Bi). Among such elements, at least one selected from Co, Ni, Mn, and Al is preferably contained.

The lithium transition metal oxide preferably contains at least one of W and Zr. It is considered that W and Zr improve the output retention percentage. The amount of W and the amount of Zr in the lithium transition metal oxide are each preferably 0.05 to 2 mol % and more preferably 0.1 to 1 mol % relative to the total molar amount of metal elements other than Li in the oxide.

At least one of W and Zr preferably forms a solid solution in the lithium transition metal oxide. The expression "W, Zr forms a solid solution in the lithium transition metal oxide" refers to a state in which metal elements, such as Ni, Co, and Mn, in the metal oxide are partly substituted by W, Zr (a state in which W, Zr is present in the crystal). Whether W, Zr forms a solid solution in the lithium transition metal oxide and the amount of W, Zr in the solid solution are determined by dividing a particle or grinding a particle surface and examining the inside of the particle by, for example, auger electron spectroscopy (AES), secondary ion mass spectrometry (SIMS), or transmission electron microscope (TEM)-energy dispersive X-ray spectrometry (EDX).

An additive, such as a tungsten oxide or a phosphoric acid compound, may be attached to the surface of the lithium transition metal oxide particles. Examples of the tungsten oxide include $WO_3$, $WO_2$, and $W_2O_3$. Among the above oxides, $WO_3$, in which W is hexavalent and is thus stable, is preferable. Examples of the phosphoric acid compound include lithium phosphate, lithium dihydrogen phosphate, cobalt phosphate, nickel phosphate, manganese phosphate, potassium phosphate, calcium phosphate, sodium phosphate, magnesium phosphate, ammonium phosphate, and ammonium dihydrogen phosphate. Such compounds may be used alone or in a combination of two or more.

From the viewpoint of, for example, stability during overcharging, a preferable example of the phosphoric acid compound is lithium phosphate. As the lithium phosphate, lithium dihydrogen phosphate, lithium hydrogen phosphite, lithium monofluorophosphate, or lithium difluorophosphate may be used, and trilithium phosphate ($Li_3PO_4$) is preferably used. The lithium phosphate is in a state of particles having a median diameter (D50) of, for example, 50 nm to 10 μm, preferably 100 nm to 1 μm. The median diameter is measured by a laser diffraction method.

The amount of tungsten oxide or phosphoric acid compound attached to the surface of the lithium transition metal oxide particles is preferably 0.1 to 10 mass % and more preferably 1 to 7 mass % relative to the mass of the lithium transition metal oxide.

[Separator]

As the separator, for example, a porous sheet having ion permeability and insulating properties is used. Specific examples of the porous sheet include microporous thin films, woven fabric, and nonwoven fabric. The separator is formed of polyolefin, such as polyethylene or polypropylene, or cellulose. The separator may be a laminate including a cellulose fiber layer and a fiber layer of a thermoplastic resin, such as polyolefin. The separator may be a multilayer separator including a polyethylene layer and a polypropylene layer and may include a surface layer formed of an aramid resin or a surface layer containing an inorganic filler.

[Nonaqueous Electrolyte]

The nonaqueous electrolyte contains a nonaqueous solvent and a solute (electrolyte salt) dissolved in the nonaqueous solvent. As the nonaqueous solvent, for example, an ester, an ether, a nitrile, an amide, such as dimethylformamide, an isocyanate, such as hexamethylene diisocyanate, or a mixed solvent in which two or more of the above compounds are mixed may be used. The nonaqueous solvent may contain a halogen-substituted derivative in which hydrogen atoms of the above solvent are at least partly substituted by halogen atoms, such as fluorine.

Examples of the ester include cyclic carbonic acid esters, such as ethylene carbonate (EC), propylene carbonate (PC), and butylene carbonate, linear carbonic acid esters, such as dimethyl carbonate (DMC), ethyl methyl carbonate (EMC), diethyl carbonate (DEC), methyl propyl carbonate, ethyl propyl carbonate, and methyl isopropyl carbonate, cyclic carboxylic acid esters, such as γ-butyrolactone and γ-valerolactone, and linear carboxylic acid esters, such as methyl acetate, ethyl acetate, propyl acetate, methyl propionate (MP), and ethyl propionate.

Examples of the ether include cyclic ethers, such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineol, and crown ether, and linear ethers, such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl.

Examples of the nitrile include acetonitrile, propionitrile, butyronitrile, valeronitrile, n-heptanitrile, succinonitrile, glutaronitrile, adiponitrile, pimelonitrile, 1,2,3-propanetricarbonitrile, and 1,3,5-pentanetricarbonitrile.

Examples of the electrolyte salt include $LiBF_4$, $LiCO_4$, $LiPF_6$, $LiAsF_6$, $LiSbF_6$, $LiAlCl_4$, $LiSCN$, $LiCF_3SO_3$, $LiCF_3CO_2$, $Li(P(C_2O_4)F_4)$, $LiPF_{6-x}(C_nF_{n+1})$. ($1<x<6$, n equals 1 or 2), $LiB_{10}Cl_{10}$, LiCl, LiBr, LiI, chloroborane lithium, lower aliphatic lithium carboxylates, boric acid salts, such as $Li_2B_4O_7$ and $Li(B(C_2O_4)F_2)$, and imide salts, such as $LiN(SO_2CF_3)_2$, $LiN(C_1F_{2l+1}SO_2)(C_mF_{2m+1}SO_2)$ (l, m is an integer of 1 or more). As the electrolyte salt, such compounds may be used alone or in a combination of two or more. The concentration of the electrolyte salt is, for example, 0.8 to 1.8 mol per liter of the nonaqueous solvent.

The nonaqueous electrolyte may further contain lithium difluorophosphate ($LiPO_2F_2$). Addition of $LiPO_2F_2$ to the nonaqueous electrolyte improves the low-temperature regeneration of the battery. The amount of $LiPO_2F_2$ is, for example, 0.01 to 0.1 mol per litter of the nonaqueous solvent containing an electrolyte salt. Vinylene carbonate (VC), LiBOB:$Li(B(C_2O_4)_2)$ may be added to the nonaqueous electrolyte.

EXAMPLES

Hereinafter, the present disclosure will be further described according to Examples; however, the present disclosure is not limited to Examples.

Example 1

[Production of Negative Electrode]

The raw material powders of lithium hydroxide (LiOH—$H_2O$) and titanium oxide ($TiO_2$) were weighed such that the molar ratio of Li to Ti was slightly more than the stoichiometric ratio, and mixed together by using a mortar. The raw material of $TiO_2$ had an anatase-type crystal structure. The raw material powder mixture was placed in an $Al_2O_3$ crucible and subjected to heat treatment at 850° C. for 12 hours in the ambient atmosphere. The heat-treated material was ground in the mortar to obtain a crude powder of lithium titanate ($Li_4Ti_5O_{12}$). The obtained crude powder of $Li_4Ti_5O_{12}$ was examined by powder X-ray diffraction, and a single-phase diffraction pattern of a spinel-type structure that belongs to the Fd3m space group was obtained. The crude powder of $Li_4Ti_5O_{12}$ was ground by using a jet mill and classified to obtain a $Li_4Ti_5O_{12}$ powder having a D50 of 0.7 μm. The BET specific surface area of the $Li_4Ti_5O_{12}$ powder was measured by using a specific surface area measuring apparatus (manufactured by Shimadzu Corporation, TriStar II 3020) and was 6.8 $m^2/g$. The $Li_4Ti_5O_{12}$ powder was used as the negative electrode active material.

The negative electrode active material, carbon black, and polyvinylidene fluoride were mixed together at a mass ratio of 91:6.3:2.7, and an appropriate amount of N-methyl-2-pyrrolidone was added thereto. Thereafter, the mixture was kneaded to prepare a negative electrode mixture slurry (1).

The negative electrode active material, carbon black, polyvinylidene fluoride, and lithium polyacrylate (PAA-Li) were mixed together at a mass ratio of 91:6.3:2.43:0.27, and an appropriate amount of N-methyl-2-pyrrolidone was added thereto. Thereafter, the mixture was kneaded to prepare a negative electrode mixture slurry (2).

Next, as illustrated in FIG. 1, the negative electrode mixture slurry (1) was applied to each surface of an aluminum negative electrode current collector having a thickness of 15 μm and dried to form a first negative electrode mixture layer (thickness after compression 32 μm). Then, the negative electrode mixture slurry (2) was applied to each of the first negative electrode mixture layer and dried to form a second negative electrode mixture layer (thickness after compression 32 μm). Thereafter, rolling was performed by using a roller, and an aluminum current collecting tab was further attached to produce a negative electrode in which a negative electrode mixture layer was formed on each surface of the negative electrode current collector.

In the produced negative electrode, the mass of the negative electrode active material contained in the first negative electrode mixture layer is the same as the mass of the negative electrode active material contained in the second negative electrode mixture layer. The amount of PAA-Li is 5 mass % relative to the total amount of PAA-Li and polyvinylidene fluoride. All PAA-Li is present in the second negative electrode mixture layer. In other words, all PAA-Li is present in a portion of the negative electrode mixture layer that extends from the surface to the middle of the negative electrode mixture layer in the thickness direction. The amount of PAA-Li is 0.15 mass % relative to the total amount of negative electrode active material.

[Production of Positive Electrode Active Material]

A hydroxide represented by the formula [$Ni_{0.50}Co_{0.20}Mn_{0.30}$](OH)$_2$ that was obtained by coprecipitation was fired at 500° C. to obtain a nickel-cobalt-manganese composite oxide. Next, lithium carbonate, the nickel-cobalt-manganese composite oxide, and tungsten oxide (WO$_3$) were mixed in an Ishikawa type grinding mortar such that the molar ratio of Li/total amount of Ni, Co, and Mn/W in WO$_3$ was 1.2:1:0.005. The mixture was heat-treated at 900° C. for 20 hours in the ambient atmosphere and ground, and thus, a lithium transition metal oxide (a positive electrode active material) represented by the formula $Li_{1.07}$[$Ni_{0.465}Co_{0.186}Mn_{0.275}W_{0.005}$]$O_2$ in which W forms a solid solution was obtained. The obtained composite oxide powder was observed with a scanning electron microscope (SEM) to confirm that an unreacted tungsten oxide did not remain.

[Production of Positive Electrode]

The positive electrode active material, acetylene black, and polyvinylidene fluoride were mixed together at a mass ratio of 93.5:5:1.5, and an appropriate amount of N-methyl-2-pyrrolidone was added thereto. Thereafter, the mixture was kneaded to prepare a positive electrode mixture slurry. The positive electrode mixture slurry was applied to each surface of a positive electrode current collector made of an aluminum foil, and the coating was dried. Thereafter, rolling was performed by using a roller, and an aluminum current collecting tab was further attached to produce a positive electrode in which the positive electrode mixture layer was formed on each surface of the positive electrode current collector.

[Preparation of Nonaqueous Electrolyte]

To prepare a nonaqueous electrolyte, LiPF$_6$ was dissolved at a ratio of 1.2 mol/L in a mixed solvent in which propylene carbonate (PC), ethylmethyl carbonate (EMC), and dimethyl carbonate (DMC) were mixed together at a volume ratio of 25:35:40.

[Production of Battery]

The positive electrode and the negative electrode were spirally wound with a separator disposed therebetween, the separator having a three-layer structure composed of polypropylene (PP)/polyethylene (PE)/polypropylene (PP), and vacuum-dried under a condition of 105° C. for 150 minutes to produce an electrode body having a wound structure. In an argon atmosphere in a glove box, the electrode body and the nonaqueous electrolyte were sealed in an outer body formed of an aluminum laminate sheet to produce a battery. The designed capacity of the battery was 11 mAh.

Example 2

A battery was produced in the same manner as in Example 1, except that the negative electrode active material, carbon black, polyvinylidene fluoride, and PAA-Li were mixed together at a ratio of 91:6.3:2.16:0.54 and an appropriate amount of N-methyl-2-pyrrolidone was added thereto during production of the negative electrode mixture slurry (2).

In the produced negative electrode, the amount of PAA-Li is 10 mass % relative to the total amount of PAA-Li and polyvinylidene fluoride. All the PAA-Li is present in the second negative electrode mixture layer. The amount of PAA-Li is 0.3 mass % relative to the total amount of negative electrode active material.

Example 3

A battery was produced in the same manner as in Example 1, except that the negative electrode active material, carbon black, polyvinylidene fluoride, and PAA-Li were mixed together at a mass ratio of 91:6.3:2.48:0.22 during production of the negative electrode mixture slurry (1) and the negative electrode active material, carbon black, polyvinylidene fluoride, and PAA-Li were mixed together at a mass ratio of 91:6.3:2.38:0.32 during production of the negative electrode mixture slurry (2).

In the produced negative electrode, the amount of PAA-Li is 10 mass % relative to the total amount of PAA-Li and polyvinylidene fluoride. The amount of PAA-Li in the first negative electrode mixture layer is 0.22 mass %. The amount of PAA-Li in the second negative electrode mixture layer is 0.32 mass %. In other words, the amount of PAA-Li in a portion of the negative electrode mixture layer that extends from the surface to the middle of the negative electrode mixture layer in the thickness direction is 60 mass % relative to the total amount of PAA-Li. The amount of PAA-Li is 0.3 mass % relative to the total amount of negative electrode active material.

Comparative Example 1

The negative electrode active material, carbon black, and polyvinylidene fluoride were mixed together at a mass ratio of 91:6.3:2.7, and an appropriate amount of N-methyl-2-pyrrolidone was added thereto. Thereafter, the mixture was kneaded to prepare a negative electrode mixture slurry (3). The negative electrode mixture slurry (3) was applied to each surface of a negative electrode current collector formed of an aluminum foil, and the coating (thickness after compression 64 µm) was dried. Thereafter, rolling was performed by using a roller, and an aluminum current collecting tab was further attached to produce a negative electrode in which the negative electrode mixture layer was formed on each surface of the negative electrode current collector. Other than the above procedure, a battery was produced in the same manner as in Example 1.

The mass of the negative electrode active material contained in the negative electrode mixture layer formed of the negative electrode mixture slurry (3) is the same as the mass of the negative electrode active material contained in the negative electrode mixture layer formed of the negative electrode mixture slurry (1) and the negative electrode mixture slurry (2).

Comparative Example 2

A battery was produced in the same manner as in Example 1, except that PAA-Li was changed to sodium carboxymethyl cellulose (CMC-Na) during production of the negative electrode mixture slurry (2). The amount of CMC-Na is 5 mass % relative to the total amount of CMC-Na and polyvinylidene fluoride. All the CMC-Na is present in the second negative electrode mixture layer. The amount of CMC-Na is 0.15 mass % relative to the total amount of negative electrode active material.

Comparative Example 3

A battery was produced in the same manner as in Example 1, except that PAA-Li was changed to CMC-Na and the negative electrode active material, carbon black, polyvinylidene fluoride, and CMC-Na were mixed together at a mass ratio of 91:6.3:2.16:0.54 during production of the negative electrode mixture slurry (2). The amount of CMC-Na is 10 mass % relative to the total amount of CMC-Na and polyvinylidene fluoride. All the CMC-Na is present in the second negative electrode mixture layer. The amount of CMC-Na is 0.3 mass % relative to the total amount of negative electrode active material.

Comparative Example 4

A battery was produced in the same manner as in Example 1, except that the negative electrode active material, carbon black, polyvinylidene fluoride, and PAA-Li were mixed together at a mass ratio of 91:6.3:2.16:0.54 during production of the negative electrode mixture slurry (1) and the negative electrode active material, carbon black, polyvinylidene fluoride were mixed together at a mass ratio of 91:6.3:2.7 during production of the negative electrode mixture slurry (2).

In the produced negative electrode, the amount of PAA-Li is 10 mass % relative to the total amount of polyvinylidene fluoride. All the PAA-Li is in the first negative electrode mixture layer. In other words, all the PAA-Li is in a portion of the negative electrode mixture layer that extends from the surface, the surface being in contact with the negative electrode current collector, to the middle of the negative electrode mixture layer in the thickness direction. The amount of PAA-Li is 0.3 mass % relative to the total amount of the negative electrode active material.

Comparative Example 5

A battery was produced in the same manner as in Example 1, except that the negative electrode active material, carbon black, polyvinylidene fluoride, and PAA-Li were mixed together at a mass ratio of 91:6.3:1.62:1.08 during production of the negative electrode mixture slurry (2).

In the produced negative electrode, the amount of PAA-Li is 20 mass % relative to the total amount of PAA-Li and polyvinylidene fluoride. All the PAA-Li is present in the second negative electrode mixture layer. The amount of PAA-Li is 0.59 mass % relative to the total amount of negative electrode active material.

Comparative Example 6

A battery was produced in the same manner as in Example 1, except that the negative electrode active material, carbon black, polyvinylidene fluoride, and PAA-Li were mixed together at a mass ratio of 91:6.3:1.62:1.08 during production of the negative electrode mixture slurry (1) and the negative electrode active material, carbon black, and polyvinylidene fluoride were mixed together at a mass ratio of 91:6.3:2.7 during production of the negative electrode mixture slurry (2).

In the produced negative electrode, the amount of PAA-Li is 20 mass % relative to the total amount of PAA-Li and polyvinylidene fluoride. All the PAA-Li is present in the first negative electrode mixture layer. The amount of PAA-Li is 0.59 mass % relative to the total amount of negative electrode active material.

Comparative Example 7

A battery was produced in the same manner as in Example 1, except that the negative electrode active material, carbon black, polyvinylidene fluoride, and CMC-Na were mixed together at a mass ratio of 91:6.3:1.62:1.08 during production of the negative electrode mixture slurry (2).

In the produced negative electrode, the amount of CMC-Na is 20 mass % relative to the total amount of CMC-Na and polyvinylidene fluoride. All the CMC-Na is present in the first negative electrode mixture layer. The amount of CMC-Na is 0.59 mass % relative to the total amount of the negative electrode active material.

Comparative Example 8

A battery was produced in the same manner as in Example 1, except that the negative electrode active material, carbon black, polyvinylidene fluoride, and PAA-Li were mixed together at a mass ratio of 91:6.3:2.38:0.32 during production of the negative electrode mixture slurry (1) and the negative electrode active material, carbon black, polyvinylidene fluoride, and PAA-Li were mixed together at a mass ratio of 91:6.3:2.48:0.22 during production of the negative electrode mixture slurry (2).

In the produced negative electrode, the amount of PAA-Li is 10 mass % relative to the total amount of PAA-Li and polyvinylidene fluoride. The amount of PAA-Li in the first negative electrode mixture layer is 60 mass %, and the amount of PAA-Li in the second negative electrode mixture layer is 40 mass %. The amount of PAA-Li is 10 mass % relative to the total amount of negative electrode active material.

(Charging/Discharging Condition)

The output retention percentage of each battery in Examples and Comparative Examples was evaluated by the following method before and after a charging/discharging cycle test conducted at a high temperature. The results were summarized in Table 1.

<Condition of Charging/Discharging Cycle Test Conducted at High Temperature>

Under the following condition, each battery was charged and discharged for 50 cycles. Under a condition of a temperature of 60° C., the battery was charged at a constant charging current of 2.0 It (22 mA) until the battery voltage reached 2.65 V. Furthermore, the battery was charged at a constant battery voltage of 2.65 V until the current reached 0.055 It (0.6 mA). Next, the battery was discharged at a constant discharging current of 2.0 It (22 mA) until the voltage reached 1.5 V. The rest interval between charging and discharging was 10 minutes.

<Output Characteristics Test>

[Calculation of Output Value]

Before and after the cycle test conducted at a high temperature, under a condition of a temperature of 25° C., the battery was discharged at a constant current to 1.5 V and charged to 50% of the rated capacity. Then, the discharge final voltage was set to 1.5 V, and the output value at a state of charge (SOC) of 50% was determined from the following formula by using the maximum current value at which discharging can be performed for 30 seconds. A change in the output value at room temperature before and after the charging/discharging cycle test conducted at a high temperature was calculated as an output retention percentage.

Output value at room temperature (SOC 50%)= (maximum current value)×discharge final voltage (1.5V)

TABLE 1

|  | Proportion of PAA-Li mass % | Proportion of PAA-Li disposed in surface side portion mass % | PAA-Li content mass % | Output retention percentage % |
|---|---|---|---|---|
| Example 1 | 5 | 100 | 0.15 | 94 |
| Example 2 | 10 | 100 | 0.3 | 93 |

TABLE 1-continued

| | Proportion of PAA-Li mass % | Proportion of PAA-Li disposed in surface side portion mass % | PAA-Li content mass % | Output retention percentage % |
|---|---|---|---|---|
| Example 3 | 10 | 60 | 0.3 | 88 |
| Comparative Example 1 | — | — | — | 85 |
| Comparative Example 2 | 5 (Proportion of CMC-Na) | 100 (CMC-Na disposed) | 0.15 (CMC-Na content) | 84 |
| Comparative Example 3 | 10 (Proportion of CMC-Na) | 100 (CMC-Na disposed) | 0.3 (CMC-Na content) | 83 |
| Comparative Example 4 | 10 | 0 | 0.3 | 77 |
| Comparative Example 5 | 20 | 100 | 0.59 | 70 |
| Comparative Example 6 | 20 | 0 | 0.59 | 62 |
| Comparative Example 7 | 20 (Proportion of CMC-Na) | 100 | 0.59 (CMC-Na content) | 81 |
| Comparative Example 8 | 10 | 40 | 0.3 | 84 |

PAA-Li: Lithium polyacrylate, CMC-Na: Sodium carboxymethyl cellulose
Proportion of PAA-Li: Proportion of the amount of PAA-Li relative to the total amount of PAA-Li and polyvinylidene fluoride
Proportion of PAA-Li disposed in surface side portion: Proportion of the amount of PAA-Li in a portion that extends from the surface to the middle of the negative electrode mixture layer in the thickness direction relative to the total amount of PAA-Li
PAA-Li content: Proportion of the amount of PAA-Li relative to the amount of the negative electrode active material As illustrated in Table 1, the batteries in Examples 1 to 3 show higher output retention percentage (input-output characteristics) than those in Comparative Examples 1 to 8. It is likely that, as in Examples, the presence of 60 mass % or more of PAA-Li in a portion of the negative electrode mixture layer that extended from the surface to the middle of the negative electrode mixture layer in the thickness direction (in the second negative electrode mixture layer) decreased the number of the electrochemically active sites of LTO in the surface side portion of the negative electrode mixture layer, thereby suppressing an increase in resistance that might occur when a coating was formed by decomposition of the electrolytic solution. It is likely that, as in Examples, setting the amount of PAA-Li added to 10 mass % or less relative to the total amount of binder (0.3 mass % or less relative to the amount of negative electrode active material) suppressed an increase in the initial resistance value and, as a result, an increase in resistance during the test conducted at a high temperature was suppressed. It is likely that such an effect of suppressing an increase in resistance suppressed a decrease in the output retention percentage in Examples.

REFERENCE SIGNS LIST

1 negative electrode for nonaqueous electrolyte secondary batteries
2 negative electrode current collector
3 negative electrode mixture layer
3a upper region
3b lower region
10 nonaqueous electrolyte secondary battery
11 outer body
11a, 11b laminate film
12 accommodating portion
13 sealing portion
14 electrode body
15 positive electrode lead
16 negative electrode lead

The invention claimed is:

1. A negative electrode for nonaqueous electrolyte secondary batteries, the negative electrode comprising:
a negative electrode current collector and a negative electrode mixture layer disposed on the negative electrode current collector,
wherein the negative electrode mixture layer contains a negative electrode active material containing lithium titanate, a binder, and a (meth)acrylic acid-based polymer, and
an amount of the (meth)acrylic acid-based polymer in the negative electrode mixture layer is 10 mass % or less relative to a total amount of the (meth)acrylic acid-based polymer and the binder, and an amount of the (meth)acrylic acid-based polymer in a portion of the negative electrode mixture layer that extends from a surface to a middle of the negative electrode mixture layer in a thickness direction is 60 mass % or more relative to a total amount of the (meth)acrylic acid-based polymer.

2. The negative electrode for nonaqueous electrolyte secondary batteries according to claim 1, wherein an amount of the (meth)acrylic acid-based polymer in the negative electrode mixture layer is 0.01 mass % or more and 3 mass % or less relative to an amount of the negative electrode active material.

3. A nonaqueous electrolyte secondary battery comprising:
a negative electrode and a positive electrode,
wherein the negative electrode is the negative electrode for nonaqueous electrolyte secondary batteries according to claim 1.

4. The nonaqueous electrolyte secondary battery according to claim 3, wherein the positive electrode contains a positive electrode active material containing a lithium transition metal oxide, and
the lithium transition metal oxide contains at least one of tungsten (W) and zirconium (Zr).

5. A nonaqueous electrolyte secondary battery comprising:
a negative electrode and a positive electrode,
wherein the negative electrode is the negative electrode for nonaqueous electrolyte secondary batteries according to claim 2.

* * * * *